UNITED STATES PATENT OFFICE.

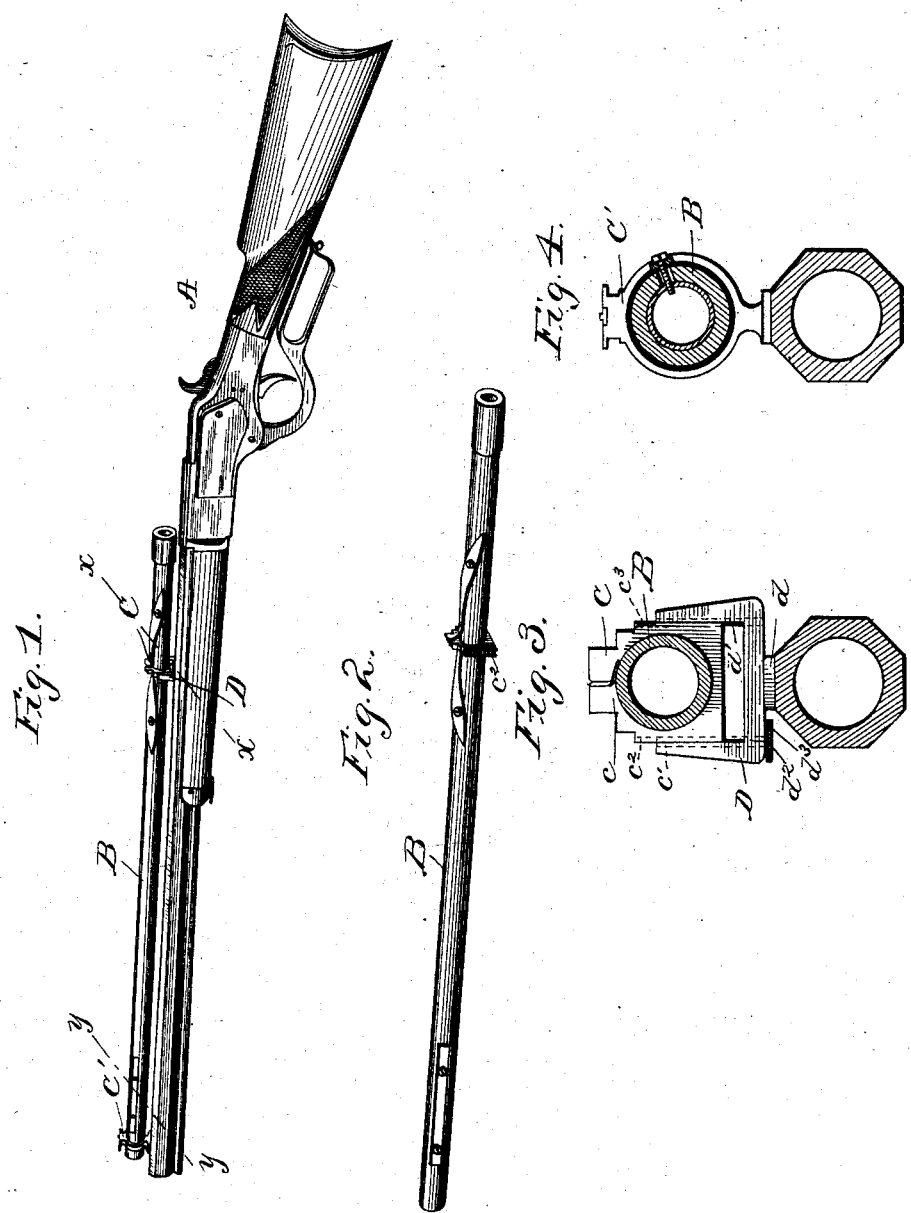

RALSA C. RICE, OF WARREN, OHIO.

TELESCOPIC SIGHT FOR FIRE-ARMS.

SPECIFICATION forming part of Letters Patent No. 374,202, dated December 6, 1887.

Application filed April 4, 1887. Serial No. 233,665. (No model.)

*To all whom it may concern:*

Be it known that I, RALSA C. RICE, a citizen of the United States, residing at Warren, in the county of Trumbull and State of Ohio, have invented a new and useful Improvement in Rifle-Telescopes, of which the following is a specification.

My invention relates to rifle-telescopes; and it consists in the construction of a novel form of telescope and sight adjustment, combined and arranged in connection with a rifle-barrel, which will be more fully hereinafter described, and pointed out in the claims.

One object of my invention is to provide a telescope to be used with rifles, wherein the construction of the lenses is such that the eye may be situated four inches and upward from the eye-lens and still retain perfect "field and vision."

A further object of my invention is to provide a telescope to be used with rifles or other fire-arms, wherein the construction of the lenses is such that the light passing through the telescope and to the eye is greatly increased, thus defining the object with great brilliancy.

A further object of my invention is to provide a telescope to be used with rifles or other fire-arms, which is provided with an open sight, whereby objects at a distance as well as in near proximity can be sighted by the same attachment.

A further object of my invention is to provide a telescope to be used on rifles or other fire-arms, wherein the parts are of simple and effective construction and operation, strong and durable, easily handled and readily understood, positive in their desired ultimate result, unaffected by the discharge and recoil of the fire-arm, convenient and accessible, cheaply manufactured, and adapted to be applied in connection with any fire-arm now in use.

I attain these objects by the construction illustrated in the accompanying drawings, wherein like letters of reference indicate similar parts in the several views, and in which—

Figure 1 is a perspective view of a rifle with my improvements applied in connection therewith. Fig. 2 is a perspective view of the telescope and open sight removed from the barrel of the rifle. Fig. 3 is a vertical cross-section on the line $x\,x$ of Fig. 2. Fig. 4 is a vertical cross-section on the line $y\,y$ of Fig. 2.

A indicates a rifle of any preferred form of construction, and B is a telescope mounted upon and secured to the top thereof. This telescope is provided with lenses, which are so arranged that the field of vision will be open and clear to the eye at a distance of four inches away from the eye-lens, and whose power is such that objects at five hundred or one thousand yards are perfectly visible to the open eye. The telescope is further capable of increasing the light entering the same and producing a more brilliant light with increased power. The lenses are also capable of producing an illumination and brilliancy to the eye in dark woods or other places, and by this means is made especially useful. The eye-lens is situated at such a point on the fire-arm as to render the eye in the proper relative position thereto when sighting. The parts of the telescope are adjustable, and the focus of the lenses may be changed as desired.

Near the eye-lens end of the telescope B and the end of the barrel of the rifle open sights C and C' are mounted, which surround the telescope and rest upon and are secured to the top of the barrel of the rifle. The sight C consists of the fine notch-plate $c$, which surrounds the telescope. The vertical sides of the plate $c$ are provided with semicircular grooves $c^2 c^3$, the groove $c^2$ being provided with a screw-threaded surface, for a purpose which will be more fully hereinafter described. A metallic strip, D, surrounds the semicircularly-grooved sides of the plate $c$, and also passes under said plate between the under portion thereof and the top of the rifle-barrel. The strip D, which is in the form of a metallic binding, is the elevation adjusting-plate for changing the sight.

On the lower central portion of the plate or strip D a rest, $d$, is formed, which bears on the upper portion of the barrel of the rifle. A smooth pin, $d'$, secured in one of the vertical arms of the plate or strip, engages with the semicircular groove $c^3$ in the plate $c$. In the other vertical arm of the plate or strip D a screw-rod, $d^2$, engages with the screw-threaded surface of the groove $c^2$, and as said screw-threaded rod $d^2$ is turned by means of a thumbwheel, $d^3$, the telescope B will be raised or lowered, as may be desired, while the aim is being taken, and without unnecessary delay.

The point-sight C' is constructed in the form of a ring surrounding the telescope B, having a base-rest, $c^4$, and a sight-lug, $c^5$, wherein a groove or notch is formed, in which a guide, $c^6$, of suitable white material, is secured, which greatly facilitates the operation of the open sight. This end of the telescope adjacent to the sight C' is provided with a metallic strip, $e$, which is secured by screws $e'\ e'$ to an adjustable cylinder on the inner portion of the telescope, which carries the forward lens, and by which the focus of the telescope may be readily adjusted.

By my improvement I combine two kinds of sights within full view of the eye without any adjustment whatever. For all purposes, especially hunting, both are necessary—the telescope at long range and the open sight for close range and game in motion. Ordinary telescopes require the eye to be within two inches of the eye-lens at the greatest distance. By my device a space of even eight inches is allowed between the eye and eye-lens and retain all the "space and field of vision," thereby requiring the telescope to extend only to the rear end of the barrel. My improved form of telescope increases and conveys all of the light to the eye, and thereby provides a valuable improvement for hunting in dark woodlands and other places.

The open sights are rendered convenient by the ready adjustment without cessation of aim, and the telescopic sight and the open sight, being arranged in close and convenient proximity to the eye, render the improvements of great value to sportsmen and the public generally.

It is obvious that many minor variations in the construction and arrangement of the parts might be made and substituted for those shown and described without in the least departing from the nature and principle of my invention.

Having thus described my invention, I claim—

1. The combination, with a fire-arm, of a telescope adapted to be sighted from a considerable distance, an open sight in which said telescope is mounted, and means, as set forth, for raising and lowering the sight and telescope, substantially as described.

2. The combination, with a fire arm, of a telescope adapted to be sighted from a considerable distance, an open sight consisting of a point-sight containing a guide of white material and an adjustable notch-sight, the said telescope passing through the sights, and means, as set forth, for operating the several parts, substantially as described.

3. In combination with a fire-arm, a telescope adapted to be raised and lowered on the barrel of a gun and having a light-increasing focus, an open sight the rear portion of which consists of a stationary plate and a movable binding-strip, and a thumb-screw intermeshing therewith for operating the said sight, substantially as described.

4. In combination with a fire-arm, a telescope, B, adapted to be raised or lowered, an open sight consisting of the guide-plates C and C', the plate D, movable on the plate C, and a thumb-screw intermeshing therewith for operating the sight to raise and lower the telescope, substantially as described.

5. The combination, with a fire-arm, of a telescope mounted on the top portion thereof and passing through rear and forward sights, substantially as described.

In testimony that I claim the foregoing as my own I have hereto affixed my signature in presence of two witnesses.

RALSA C. RICE.

Witnesses:
ADALINE A. RICE,
CLARA L. DENNISON.